(12) United States Patent
Walter et al.

(10) Patent No.: US 7,274,126 B2
(45) Date of Patent: Sep. 25, 2007

(54) MOTOR ARMATURE HAVING DISTRIBUTED WINDINGS FOR REDUCING ARCING

(75) Inventors: Richard T. Walter, Baltimore, MD (US); Ren Hong Wang, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 239 days.

(21) Appl. No.: 10/936,003

(22) Filed: Sep. 8, 2004

(65) Prior Publication Data

US 2005/0206268 A1    Sep. 22, 2005

Related U.S. Application Data (60) Continuation-in-part of application No. 10/404,857, filed on Apr. 1, 2003, now Pat. No. 7,051,420, which is a division of application No. 09/594,357, filed on Jun. 14, 2000, now Pat. No. 6,566,782.

(51) Int. Cl.
*H02K 1/10* (2006.01)
*H02K 3/38* (2006.01)

(52) U.S. Cl. .................. 310/225; 310/198; 310/234

(58) Field of Classification Search ............. 310/225, 310/206, 198, 184, 179, 180, 220, 222, 224, 310/234, 158; 29/598, 605, 606
See application file for complete search history.

(56) References Cited

U.S. PATENT DOCUMENTS

| | | | | |
|---|---|---|---|---|
| 841,545 A | 1/1907 | Latour | .................. | 310/225 |
| 1,742,112 A | 12/1929 | Welsch | .................. | 310/198 |
| 2,103,166 A | 12/1937 | Morrill | .................. | 310/206 |
| 2,272,749 A | 2/1942 | Lane et al. | .................. | 310/225 |
| 2,598,464 A | 5/1952 | Thomas | .................. | 310/206 |
| 2,921,207 A | 1/1960 | Fletcher | .................. | 310/206 |
| 3,631,278 A | 12/1971 | Snively | .................. | 310/158 |

(Continued)

FOREIGN PATENT DOCUMENTS

CN        86203906        2/1987

(Continued)

*Primary Examiner*—Karl Tamai
(74) *Attorney, Agent, or Firm*—Harness, Dickey & Pierce, P.L.C.

(57) ABSTRACT

An armature for a brush commutated electric motor having a distributed coil winding arrangement for reducing brush arcing and electromagnetic interference (EMI). The winding pattern involves winding a first coil into a first pair of slots of the armature. A second coil having a first subcoil portion is then wound into the same slots as the first coil, while a second subcoil portion of the second coil is wound into a pair of slots that is offset by one slot position from the first pair of slots. The two subcoil portions have the same number of turns, and the total turns of the two subcoil portions equals the number of turns of the first coil. A third coil is then wound in the same slots as the second subcoil portion of the second coil. The third coil has the same number of turns as the first coil. This pattern is repeated around the armature. In a two coil per slot armature, this pattern enables the magnetic axis of each coil to be maintained at a constant angular position relative to the commutator bars to which it is coupled without the need for using uneven numbers of turns for the two subcoil portions of each segmented coil.

15 Claims, 9 Drawing Sheets

U.S. PATENT DOCUMENTS

| | | | |
|---|---|---|---|
| 3,818,257 A * | 6/1974 | Porter et al. | 310/179 |
| 4,292,559 A | 9/1981 | Auinger et al. | 310/206 |
| 4,329,610 A | 5/1982 | Klein | 310/220 |
| 4,417,388 A * | 11/1983 | Major | 29/598 |
| 4,437,029 A | 3/1984 | Ban et al. | 310/198 |
| 4,447,751 A | 5/1984 | Ban et al. | 310/154 |
| 4,507,565 A | 3/1985 | Hamano | 290/38 |
| 4,583,016 A | 4/1986 | Ban et al. | 310/198 |
| 4,933,586 A | 6/1990 | Gotou | 310/198 |
| 5,376,852 A | 12/1994 | Kawamura et al. | 310/198 |
| 6,566,782 B1 | 5/2003 | Wang | 310/225 |
| 6,930,429 B2 * | 8/2005 | Wang | 310/225 |
| 7,000,307 B2 * | 2/2006 | Wang | 29/596 |
| 7,051,420 B2 * | 5/2006 | Wang | 29/596 |
| 7,155,811 B2 * | 1/2007 | Wang | 29/605 |

FOREIGN PATENT DOCUMENTS

| | | | |
|---|---|---|---|
| CN | 2054227 | | 3/1990 |
| DE | 109 482 | | 1/1974 |
| DE | 0 025 452 | | 8/1984 |
| DE | 37 12 652 | | 12/1989 |
| DE | 90 03 164.4 | | 8/1991 |
| DE | 0 415 493 | | 1/1994 |
| DE | 197 05 161 | | 1/1998 |
| DE | 198 18 104 | | 6/1999 |
| JP | 630035157 | * | 2/1988 |

* cited by examiner

| BAR | SLOT | SLOT | SLOT | SLOT | BAR | COIL | TOTAL WINDING TURNS |
|---|---|---|---|---|---|---|---|
| 1 | 1 | 6 | - | - | 2 | 1 | 24 |
| 2 | 1 | 6 | 2 | 7 | 3 | 2 | 12 |
| 3 | 2 | 7 | - | - | 4 | 3 | 24 |
| 4 | 2 | 7 | 3 | 8 | 5 | 4 | 12 |
| 5 | 3 | 8 | - | - | 6 | 5 | 24 |
| 6 | 3 | 8 | 4 | 9 | 7 | 6 | 12 |
| 7 | 4 | 9 | - | - | 8 | 7 | 24 |
| 8 | 4 | 9 | 5 | 10 | 9 | 8 | 12 |
| 9 | 5 | 10 | - | - | 10 | 9 | 24 |
| 10 | 15 | 10 | 6 | 11 | 11 | 10 | 12 |
| 11 | 6 | 11 | - | - | 12 | 11 | 24 |
| 12 | 6 | 11 | 7 | 12 | 13 | 12 | 12 |
| 13 | 7 | 12 | - | - | 14 | 13 | 24 |
| 14 | 7 | 12 | 8 | 1 | 15 | 14 | 12 |
| 15 | 8 | 1 | - | - | 16 | 15 | 24 |
| 16 | 8 | 1 | 9 | 2 | 17 | 16 | 12 |
| 17 | 9 | 2 | - | - | 18 | 17 | 24 |
| 18 | 9 | 2 | 10 | 3 | 19 | 18 | 12 |
| 19 | 10 | 3 | - | - | 20 | 19 | 24 |
| 20 | 10 | 3 | 11 | 4 | 21 | 20 | 12 |
| 21 | 11 | 4 | - | - | 22 | 21 | 24 |
| 22 | 11 | 4 | 12 | 5 | 23 | 22 | 12 |
| 23 | 12 | 5 | - | - | 24 | 23 | 24 |
| 24 | 12 | 5 | 1 | 6 | 1 | 24 | 12 |
| 1 | 1 | 6 | | | 2 | 1 | 24 |

MOTOR ARMATURE HAVING DISTRIBUTED WINDINGS FOR REDUCING ARCING

CROSS-REFERENCE TO RELATED APPLICATIONS

This application is a continuation-in-part of U.S. Ser. No. 10/404,857, filed Apr. 1, 2003, now U.S. Pat. No. 7,051,420, which is a divisional of U.S. Ser. No. 09/594,357, filed Jun. 14, 2000, and presently issued as U.S. Pat. No. 6,566,782 on May 20, 2003.

FIELD OF THE INVENTION

1. Technical Field

This invention relates to electric motors, and more particularly to a winding pattern for winding the coils on an armature in a manner to reduce electromagnetic interference and arcing at the brushes in contact with the commutator of the armature.

2. Background of the Invention

Figure 1:
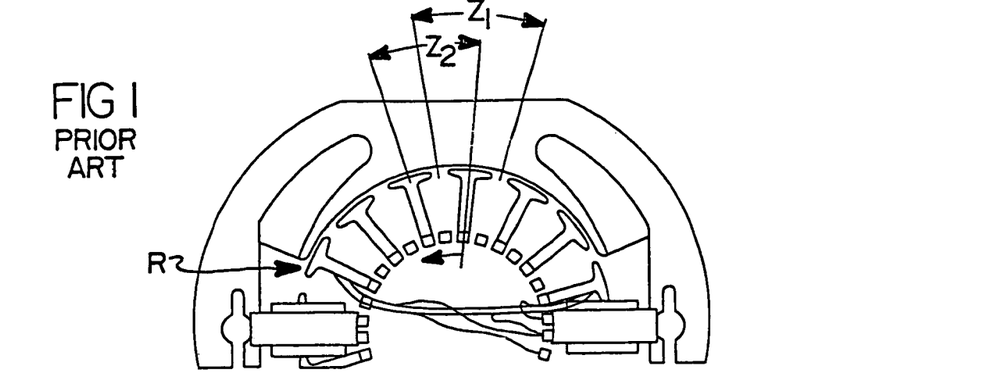
FIG. 1 is a simplified diagrammatic end view of an armature having a traditional coil winding pattern employed, and illustrating how the commutation zone of the second coil of a two-coil-per-slot winding arrangement causes the commutation zone of the second coil to lag behind the commutation zone of the first coil, thus leading to brush arcing.

Present day brush commutated electric motors include an armature having a plurality of coils wound in slots formed in the lamination stack of the armature. With traditional motor designs, the lamination stack of the armature forms a plurality of circumferentially arranged slots extending between adjacent pairs of lamination posts. Typically, two coils per slot are used when winding the armature coils on the lamination stack. Among the two coils of the same slot, the one which commutates first is referred to as the first coil and the one which commutates second as the second coil. The second coil has inherently poorer magnetic commutation than the first coil because the second coil passes beyond the magnetic neutral zone within the stator before it finishes commutation. This is illustrated in simplified fashion in FIG. 1, wherein the commutation zone of the first coil is designated by $Z_1$ and the commutation zone of the second coil is designated by $Z_2$. A Rotor "R" is shown positioned at the mid-point of the first coil commutation zone. As a result, the second coil commutation can generate significant brush arcing, and becomes the dominant source of the total brush arcing of the motor. This can also cause electro-magnetic interference (EMI) to be generated which exceeds acceptable levels set by various government regulatory agencies. This brush arcing can also lead to accelerated brush wear.

Accordingly, it is a principal object of the present invention to provide an armature for a brush commutated electric motor having a plurality of coils wound thereon in a unique sequence which serves to significantly reduce brush arcing and improve the commutation efficiency of the motor.

It is a further object of the present invention to provide an armature for a brush commutated electric motor which incorporates a unique winding pattern for the coils wound on the armature in a manner which does not otherwise require modification of any component of the armature or the need for additional components.

It is still a further object of the present invention to provide a winding pattern for the armature coils of an armature which allows EMI components usually required to sufficiently attenuate the EMI generated by brush arcing to be eliminated, thus allowing the motor to be constructed less expensively and with fewer components.

SUMMARY OF THE INVENTION

The above and other objects are provided by an armature for a brush commutated electric motor incorporating a unique, distributed winding pattern for the coils thereof, in accordance with a preferred embodiment of the present invention. The winding pattern involves segmenting each coil into first and second subcoil portions. With a first coil, the first subcoil portion is wound around two spaced apart slots for a first plurality of turns and the second subcoil portion is wound around a second pair of spaced apart slots which are shifted circumferentially from the first pair of slots. The second subcoil portion is also formed by a different plurality of winding turns than the first subcoil portion. The two subcoil portions are wound in series with one end coupled to a first commutator segment of the armature and the other end coupled to a second commutator segment.

A second coil is also divided into first and second subcoil portions, with the first subcoil portion being wound with the same number of turns as the second subcoil portion of the first coil, and in the second pair of spaced apart slots. The second subcoil portion of the second coil, however, is laterally shifted such that it is wound in a third pair of spaced apart slots shifted laterally by one slot from the second pair of slots. The second subcoil portion of the second coil is also wound a plurality of turns in accordance with that of the first portion of the first coil. One end of the first subcoil portion of the second coil is coupled to commutator segment number two while the end of subcoil portion two of coil two is coupled to commutator segment number three.

Coil number three is segmented into first and second subcoil portions with the first subcoil portion being wound a number of turns in accordance with the second subcoil portion of the second coil, and wound around the second pair of spaced apart slots. The second subcoil portion of the third coil is wound around the third pair of spaced apart slots but with a number of turns in accordance with the first subcoil portion of the second coil. The end of the first subcoil portion of the third coil is coupled to commutator segment number three while the end of the second subcoil portion of coil three is coupled to commutator segment number four.

The above winding pattern continues in alternating fashion such that an overlapping of the coils occurs around the lamination stack. In effect, all of the first subcoil portions shift their magnetic axes forward with respect to rotation of the armature, and all of the second coil portions shift their magnetic axes backward relative to the direction of armature rotation. With a desired turns ratio between the two subcoil portions of each coil, which ratio may vary considerably but is preferably about 3:1, the above described winding pattern smoothes out the "unevenness" in the magnetic coupling between adjacent armature coils, thus improving commutation efficiency. This also improves the commutation efficiency for the second subcoil portion of each coil, thus reducing brush arcing. This in turn serves to significantly reduce EMI. The reduction of EMI eliminates the need for expensive EMI suppression components that have previously been required for use with the motor brushes to ensure that EMI levels remain below regulated limits.

In an alternative preferred embodiment of the present invention a motor is disclosed having an armature that incorporates a plurality of coils wound in an overlapping fashion. Alternating ones of the coils are segmented into serially coupled subcoils that overlap with non-segmented coils. This pattern permits the same number of winding turns to be used for the two subcoil portions, while still obtaining the benefits of reduced brush arcing and improved commutation efficiency in a two coil per slot electric motor. In this embodiment slots 1 and 6 of the armature include a plurality of winding turns from a first coil. Slots 1 and 6 of the armature also include a plurality of winding turns from a first subcoil portion of a second coil. The second subcoil portion of the second coil is wound in slots 2 and 7, and thus is offset by one slot position from the first subcoil portion. Each of the two subcoil portions has the same number of turns. The total turns of the two subcoil portions preferably add up to the same number of turns as employed with the first coil. A third coil is then wound in slots 2 and 7 with the same number of winding turns used for coil one. A fourth coil has first and second subcoil portions, with the first subcoil portion being wound in slots 2 and 7 and the second subcoil portion being wound in slots 3 and 8. Thus, the first subcoil portion of the fourth coil overlaps completely the windings of the third coil. This arrangement also helps to smooth out the unevenness in the magnetic coupling between adjacent coils while providing a close coupling between the coils wound in adjacent pairs of winding slots of the armature. This construction further has the advantage of reducing winding costs by reducing the number of winding machine indexes that must be employed, and thus simplifying the motor construction process.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 2:
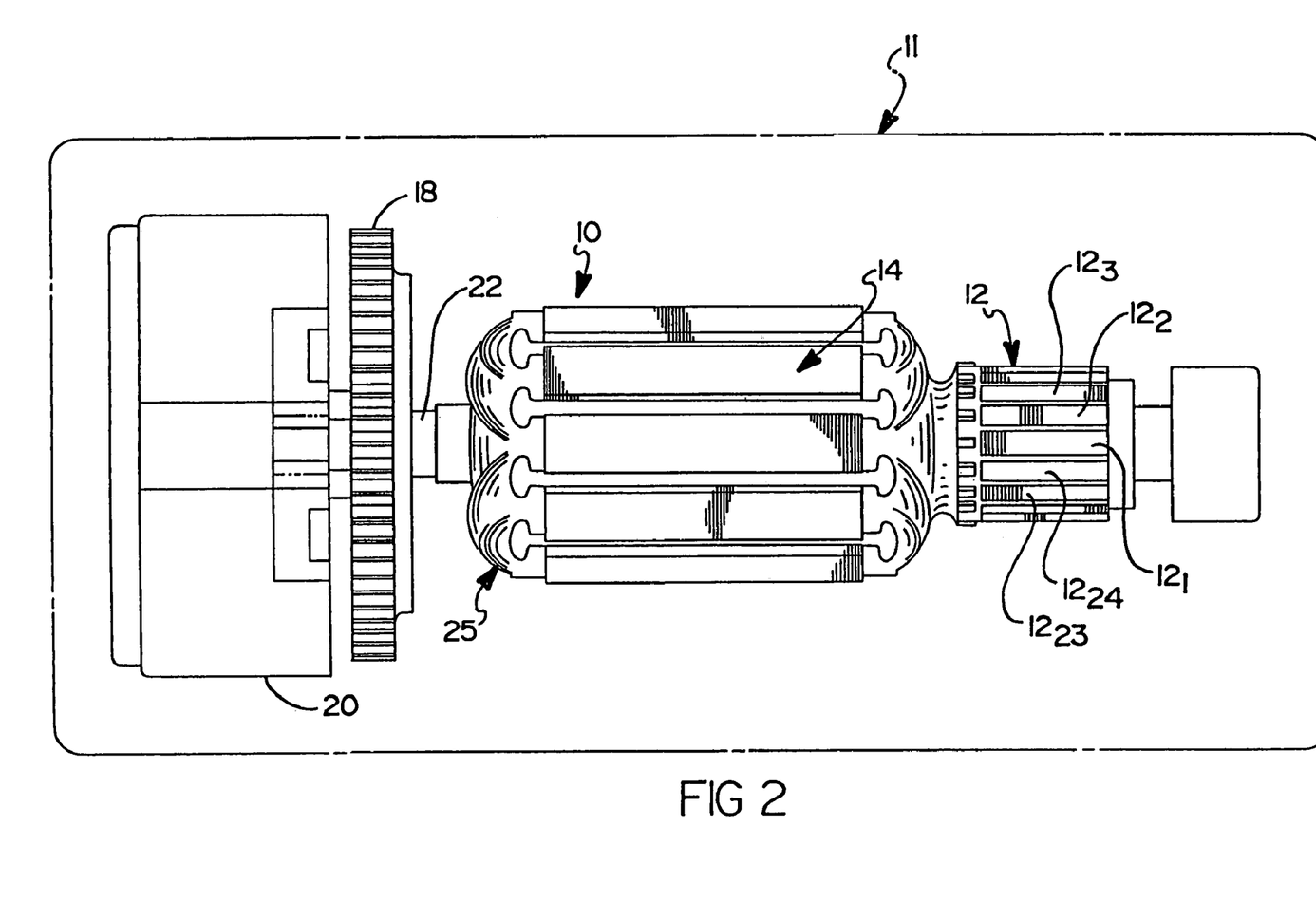
FIG. 2 is a side elevational view of an exemplary armature constructed in accordance with the teachings of the present invention.

Referring to FIG. 2, there is shown an armature 10 for a brush commutated electric motor 11 having a plurality of coils wound in accordance with the teachings of the present invention. The armature 10 includes a commutator 12 which, merely by way of example, includes 24 independent commutator segments $12_1$-$12_{24}$. A lamination stack 14 is used to support a plurality of 24 coils $25_1$-$25_{24}$ wound thereon. An armature shaft 22 extends through the lamination stack 14 and is fixedly coupled to a gear reduction assembly 20 and also to a fan 18. It will be appreciated, though, that the fan 18 and the gear reduction assembly 20 are optional and not essential to the armature 10 of the present invention, and shown merely because they are components that are often used in connection with an armature for an electric motor.

Figure 3:
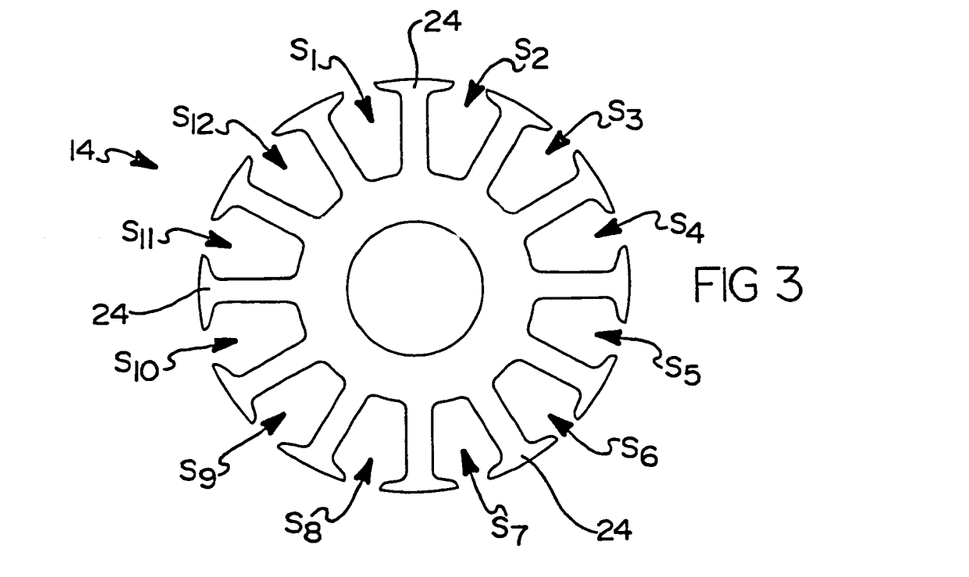
FIG. 3 is a simplified cross sectional end view of the armature of FIG. 2 illustrating a lamination stack for an armature having a plurality of twelve slots around which the coils of the armature are to be wound.

Referring to FIG. 3, the lamination stack 14 is illustrated without any coils wound thereon. The lamination stack 14 includes a plurality of radially projecting lamination posts or "teeth" 24. Twelve slots $S_1$-$S_{12}$ are formed between the posts 24. It will be appreciated immediately, however, that while twelve such slots are illustrated, that a greater or lesser plurality could be employed. The overall number of slots depends on the number of commutator segments and will always be one-half the number of commutator segments used.

Figure 4:
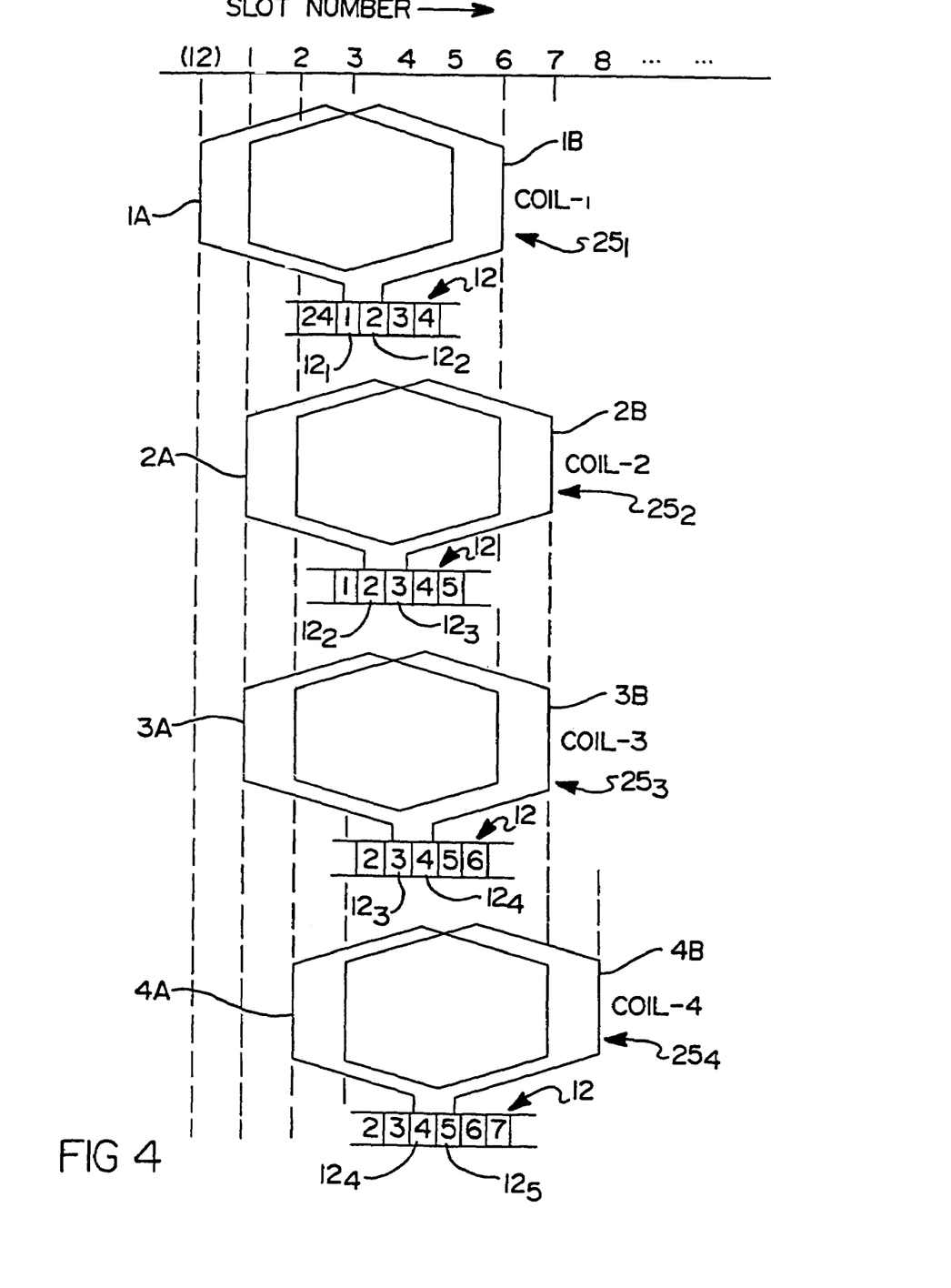
FIG. 4 illustrates in simplified fashion a coil winding pattern in accordance with the present invention.

Referring now to FIG. 4, the winding pattern of the present invention will be described. Coil number 1 ($25_1$) has a first subcoil portion 1A and a second subcoil portion 1B formed in series with subcoil portion 1A. Subcoil portion 1A has one end thereof coupled to commutator segment number $12_1$ and the end of second subcoil portion 1B is coupled to commutator segment number $12_2$. Subcoil portion 1A of coil $25_1$ includes a first plurality of turns, for example seven turns, which are wound around slots $S_{12}$ and $S_5$ of the lamination stack 14. Subcoil portion 1B of coil $25_1$ is then wound for a larger plurality of turns, in this example 17 turns, in slots $S_1$ and $S_6$ of the lamination stack 14. It will be appreciated that the precise number of windings of each subcoil portion can vary considerably, but in the preferred embodiment the number of turns between the subcoil portion 1B and portion 1A of coil $25_1$ is such that one has preferably about three times as many winding turns as the other. The number of turns also alternates between the subcoils, as will be described further, such that adjacent coils will always have the two first subcoil portions with differing numbers of winding turns, and the two second subcoil portions with differing numbers of winding turns.

Coil number 2 ($25_2$) also has a first subcoil portion 2A and a second subcoil 2B in series with one another. Subcoil portion 2A is wound in slots $S_1$ and $S_6$ with seventeen turns. Subcoil portion 2B is wound in series with portion 2A but around slots $S_2$ and $S_7$ of the lamination stack 14, and with seven winding turns. The end of subcoil portion 2A is coupled to commutator segment $12_2$ while the end of subcoil portion 2B is coupled to commutator segment $12_3$. The first subcoil portion 2A of coil $25_2$ overlaps the second subcoil portion 1B of coil $25_1$.

Coil number 3 ($25_3$) includes a first subcoil portion 3A and a second subcoil portion in series with one another 3B.

Subcoil portion 3A is attached to commutator segment number $12_3$ and includes seven winding turns wound around slots $S_1$ and $S_6$. Subcoil portion 3B is formed in series with subcoil portion 3A and includes seventeen turns wound in slots $S_2$ and $S_7$, with the end thereof being coupled to commutator segment $12_4$.

Coil 4 ($25_4$) also includes a first subcoil portion 4A and a second subcoil portion 4B in series with subcoil portion 4A. Subcoil portion 4A has its end coupled to commutator segment $12_4$ and includes seventeen turns wound around slots $S_2$ and $S_7$. Subcoil portion 4B includes seven turns wound around slots $S_3$ and $S_8$, with the end thereof being coupled to commutator segment $12_5$. It will be noted that coil $25_4$ partially overlaps coil $25_3$. In effect, one of the subcoil portions of each adjacent pair of coils 25 overlap with each other.

The above-described pattern for coils $25_1$-$25_4$ is repeated until all of the coils (in this example 24 coils) are wound onto the lamination stack 14. Each of the ends of the coils $25_1$-$25_{24}$ are further secured to immediately adjacent pairs of commutator segments $12_1$-$12_{24}$. For example, coil $25_5$ has its ends secured to commutator segments $12_5$ and $12_6$, coil $25_6$ to segments $12_6$ and $12_7$, and so forth.

Figure 5:
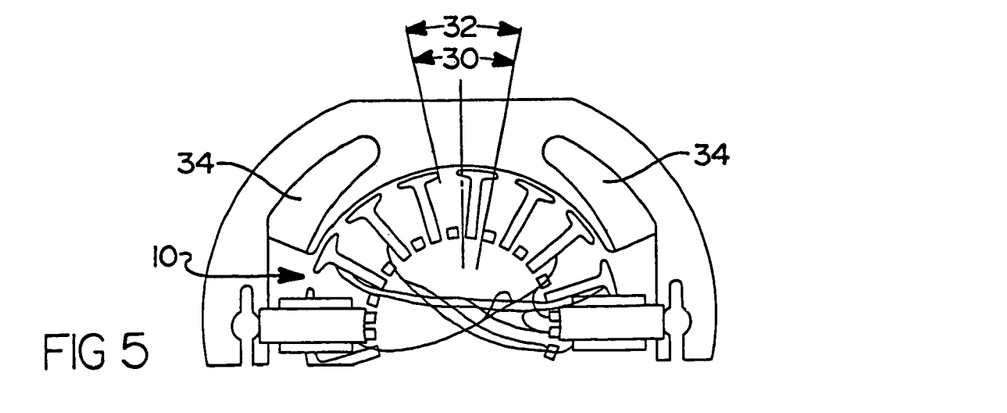
FIG. 5 is a simplified end view of the armature illustrating how the winding pattern produces commutation zones for the first and second coil with subcoil portions which are radially aligned with one another to improve commutation efficiency and reduce brush arcing.

The above-described winding pattern significantly improves the commutation performance of all of the second coil portions of the coils 25. Splitting each coil 25 into first and second subcoil portions allows each first subcoil portion to shift its magnetic axis away (i.e., laterally), from the position it would have otherwise had in a traditional two-coil-per-slot approach. This is illustrated in FIG. 5. All of the first subcoil portions shift their magnetic axes forward to produce a first coil commutation zone, as indicated by region 30, and all of the second subcoil portions shift their magnetic axes backward to produce a second coil commutation zone, as indicated by region 32, in reference to the armature's 10 rotational direction. Both of these commutation zones are now in a common angular region with respect to the field as shown in FIG. 5. With a turns ratio between the two subcoils of about 3:1, this winding pattern smoothes out the magnetic "unevenness" between adjacent coils, which is a drawback with traditional two-coil-per-slot winding patterns. This, in connection with the shifting of the resultant magnetic axes of each coil, serves to significantly improve the commutation efficiency of the motor and to reduce the overall brush arcing.

The winding pattern employed on the armature 10 of the present invention also serves to significantly reduce the cost of constructing the armature by eliminating components that would otherwise be needed to sufficiently attenuate the EMI that results from traditional two-coil-per-slot winding patterns. Typically, inductive components are required to form a choke circuit associated with each armature brush. These additional components increase the overall cost of manufacturing a motor, as well as increase the complexity of the task of replacing the brushes during repair procedures.

The apparatus and method of the present invention thus allows an armature to be formed which significantly reduces brush arcing, and therefore the EMI that is present with traditional two-coil-per-slot armature constructions for all brush commutated electric motors. The apparatus and method of the present invention further does not increase the complexity of the manufacturing process or require additional component parts that would otherwise increase the overall cost of construction of an armature.

Figure 6:
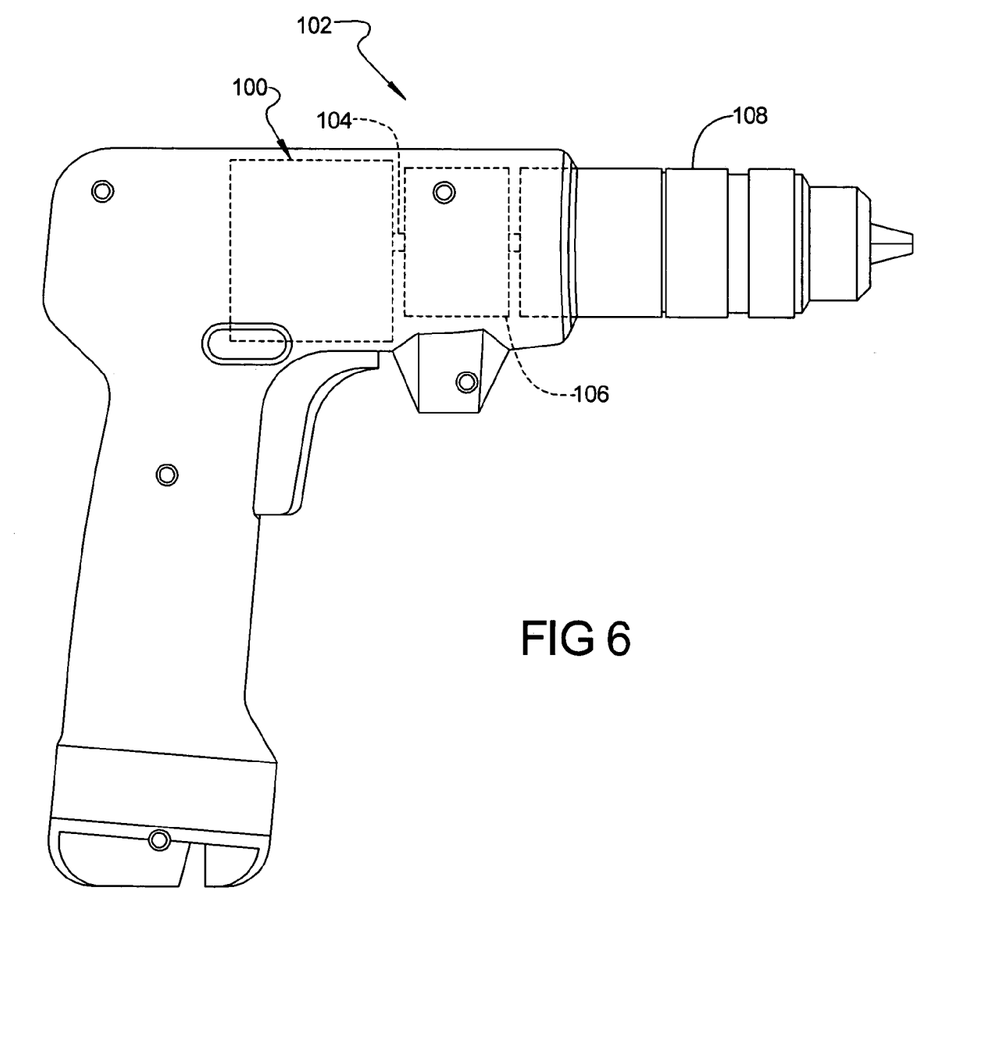
FIG. 6 is a simplified view of a power tool incorporating a motor in accordance with a preferred embodiment of the present invention.

Referring now to FIG. 6 there is shown a power tool 102 incorporating an electric motor 100 in accordance with an alternative preferred embodiment of the present invention. The motor 100 has an output shaft 104 that drives a gear reduction assembly 106. Gear reduction assembly 106 is operatively coupled to a chuck 108. The power tool 102 in this example forms an electric drill, although it will be appreciated that the motor 100 could be used with any form of power tool such as a saw, sander, hammer drill, etc. that incorporates an electric motor. The tool 102 may be battery powered or designed for use with an AC power source. The motor 100 is structurally identical to the motor 10 with the exception of a winding pattern used to form the armature coils.

Referring to FIG. 7, the winding pattern employed on an armature 110 of the motor 100 is illustrated. Again, it will be appreciated that armature 110 includes a plurality of teeth 112 that form slots therebetween. In the example shown, there are 12 slots and 12 teeth. The armature 110 has twice as many commutator bars 114 as slots. For convenience, the slots have been designated as $S_1$-$S_{12}$, although only slots $S_{12}$-$S_8$ are visible in the wiring diagrams of FIG. 7. Commutator bars 114 are designated by reference numerals $114_1$-$114_{24}$.

Figures 7A, 7B:
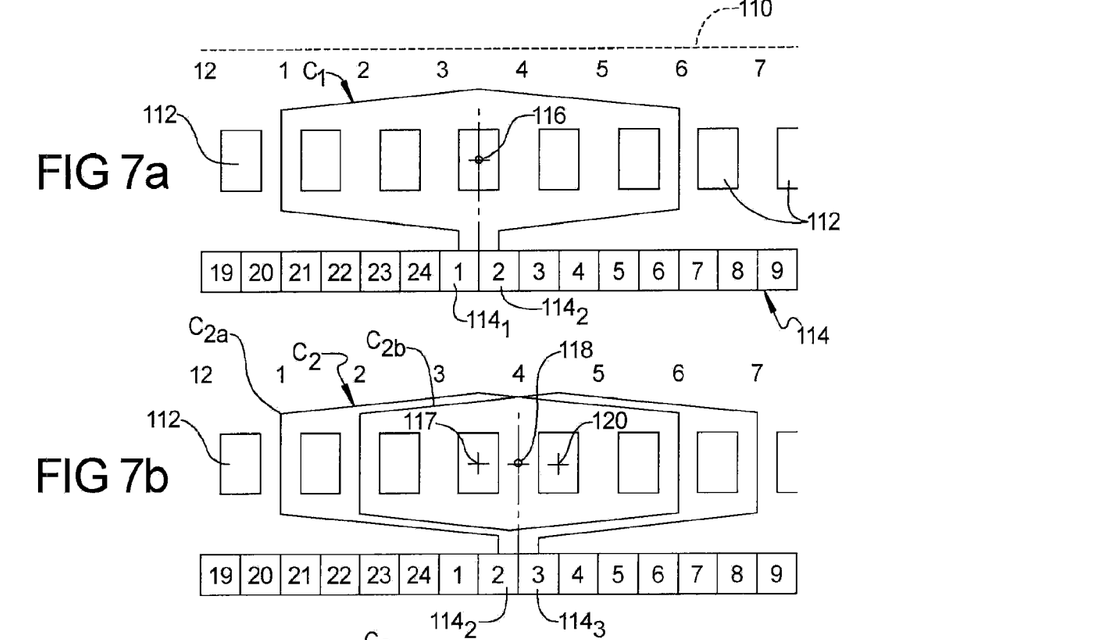
FIG. 7 is a winding diagram illustrating the winding pattern used on the armature of the motor of FIG. 6.

In FIG. 7a, a first coil $C_1$ is illustrated as being wound around slots $S_1$-$S_6$ and coupled at its ends to commutator bars $114_1$ and $114_2$. The precise number of winding turns used to form coil $C_1$ may vary but in one preferred from comprises 24 turns. It will be noted that coil $C_1$ has a magnetic axis 116 that is aligned between commutator bars $114_1$ and $114_2$.

In FIG. 7b, a second coil $C_2$ is formed in two serially coupled subcoil portions $C_{2a}$ and $C_{2b}$, with its ends coupled to commutator bars $114_2$ and $114_3$. Subcoil $C_{2a}$ is wound in slots $S_1$-$S_6$ and therefore fully overlaps with coil $C_1$. Subcoil $C_{2b}$ is wound in slots $S_2$ and $S_7$ and is therefore offset, by one slot position, from coil $C_1$ and subcoil $C_{2a}$. Subcoil $C_{2a}$ and subcoil $C_{2b}$ have the same number of winding turns, in one example 12 turns each. Subcoil $C_{2a}$ has a magnetic axis 117 that is advanced, relative to the direction of rotation of the armature 110, from the position it would have had on a traditional two coil per slot motor. Subcoil $C_{2b}$, however, has its magnetic axis 120 retarded relative to the position it would have had in a traditional two coil per slot motor. However, the resulting magnetic axis 118 of coil $C_2$ is centered between commutator bars $114_2$ and $114_3$. Thus, the resultant magnetic axis 118 of the two subcoils $C_{2a}$ and $C_{2b}$ does not shift relative to the commutator bars 114 to which coil $C_2$ is coupled, but rather remains in a constant angular position relative to its commutator bars $114_2$ and $114_3$. Since subcoil $C_{2a}$ is wound in the same slots as coil $C_1$, subcoil $C_{2a}$ is closely coupled to coil $C_1$ and therefore able to receive inductive energy from coil $C_1$ as coil $C_1$ completes commutation.

Figure 7C:
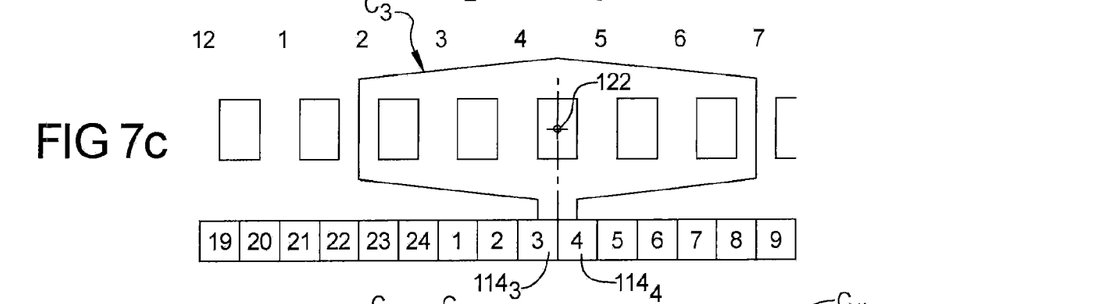

Referring to FIG. 7c, coil $C_3$ is wound in slots $S_2$-$S_7$ and coupled to commutator bars $114_3$ and $114_4$. Coil $C_3$ has its magnetic axis 122 centered between commutator bars $114_3$ and $114_4$. Coil $C_3$ also includes, in this example, 24 winding turns.

Figure 7D:
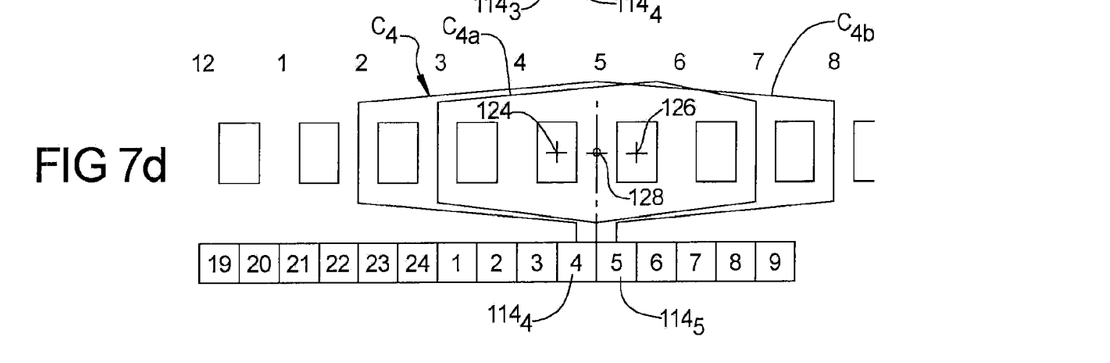

Referring to FIG. 7d, coil $C_4$ is shown having serially coupled subcoils $C_{4a}$ and $C_{4b}$. Subcoil $C_{4a}$ is wound in slots $S_2$ and $S_7$ while subcoil $C_{4b}$ is wound in slots $S_3$ and $S_8$. Subcoil $C_{4b}$ is therefore offset by one slot position from subcoil $C_{4a}$. Similarly, subcoil $C_{4a}$ is wound in the same slots as coil $C_3$, and thus is closely coupled to coil $C_3$ to receive inductive energy from coil $C_3$ as coil $C_3$ completes commutation. Subcoil $C_{4a}$ has a magnetic axis 124, while subcoil $C_{4b}$ has a magnetic axis 126. The resultant magnetic axis 128 falls directly between commutator bars $114_4$ and $114_5$. Thus, the magnetic axis of each of coils $C_1$-$C_4$ remains in the same angular position relative to the commutator bars 114 to which the ends of the particular coil are attached. This significantly reduces brush arcing and improves overall commutation of the motor 100. The above described winding pattern requires that only half of the armature coils 25 be split into pairs of subcoils thus reducing the number of winding indices needed for the winding equipment used to manufacture the motor. This leads to higher manufacturing throughput and lower costs when compared to the first preferred embodiment as shown in FIG. 4.

Figure 8:
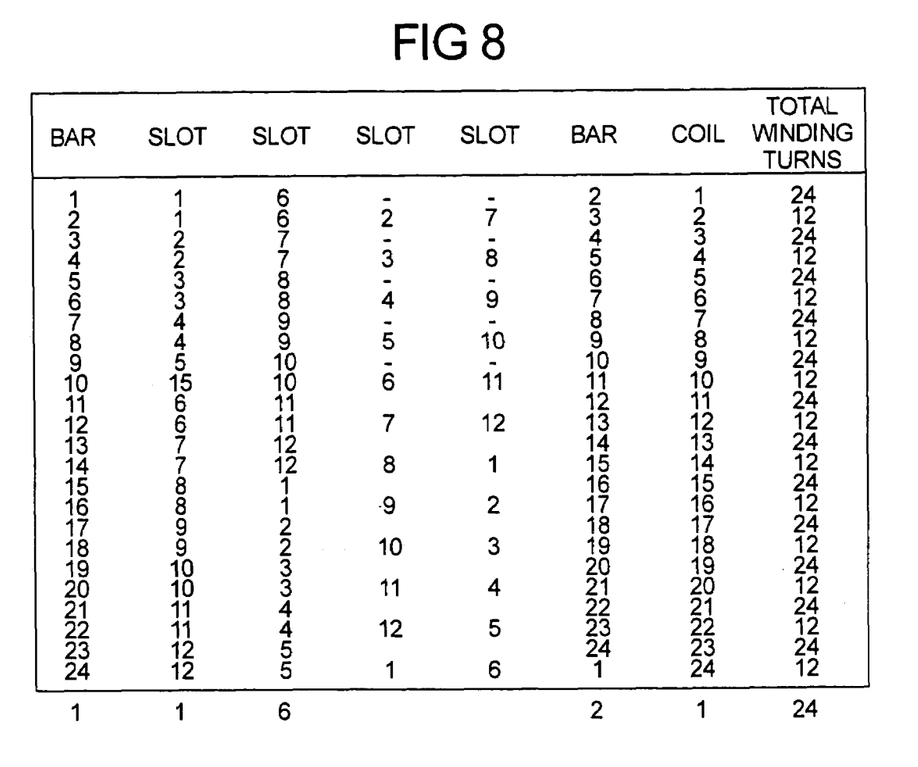
FIG. 8 is a table illustrating the portions of each of the coils used to wind the armature, the slots that each coil (or subcoil portion) are wound in, and the commutator bars to which each coil is attached.
Figure 9:
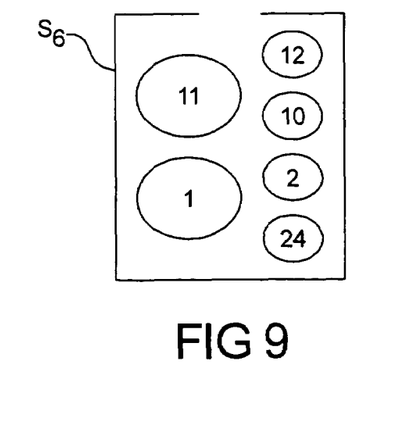
FIG. 9 is a diagrammatic view of the coils (or subcoil portions) within slot 6 of the armature.
Figure 10:
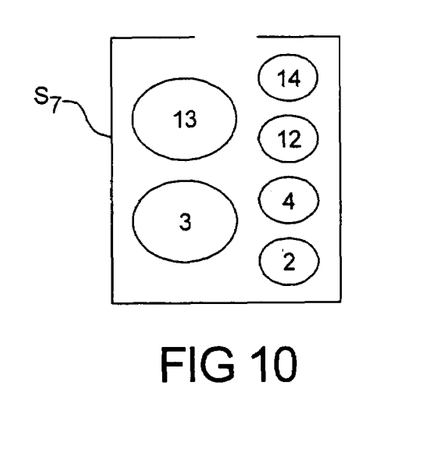
FIG. 10 is a simplified diagram of the coils (or subcoil portions) wound within slot 7 of the armature.

With reference to FIG. 8, a table is illustrated that provides a listing of the winding slots and commutator bars for each of coils $C_1$-$C_{24}$ wound onto the armature 110. FIG. 9 illustrates the coils wound into slot $S_6$ while FIG. 10 illustrates the coils wound into slot $S_7$. In FIG. 9, coils $C_{11}$ and $C_1$ are wound into slot $S_6$. Each of these coils is denoted in FIG. 8 as having 24 turns (i.e., they are not segmented into two subcoil portions). Coil $C_{12}$ has one subcoil $C_{12a}$ that is wound partially in slot $S_6$ (the other cooperating slot being slot $S_{11}$). Coil $C_{10}$ has its second subcoil $C_{10b}$ also wound partially in slot $S_6$ (the other slot being slot $S_{11}$). Coil $C_2$ has its first subcoil $C_{2a}$ wound partially in slot $S_6$ (an $S_1$). Coil $C_{24}$ has its second subcoil $C_{24b}$ wound partially in slot $S_6$ (and in slot $S_1$). In FIG. 10, coils $C_2$, $C_3$, $C_4$, $C_{12}$, $C_{13}$ and $C_{14}$ each include a portion wound in slot $S_7$.

Figure 11A:
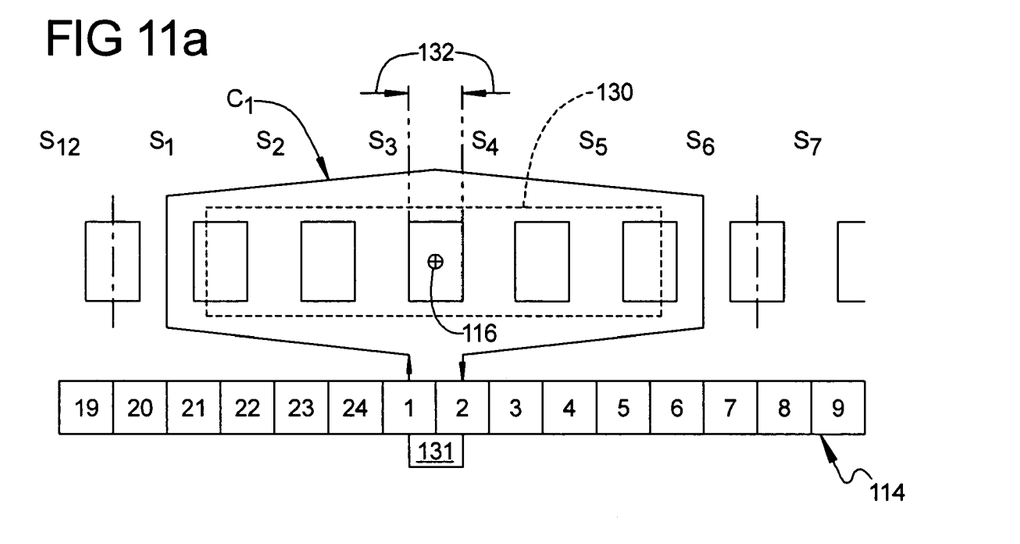
FIGS. 11, 12 and 13 are diagrams illustrating the relatively constant angular position of the magnetic axis of each coil relative to the commutator brushes to which the coil is secured.
Figure 11B:
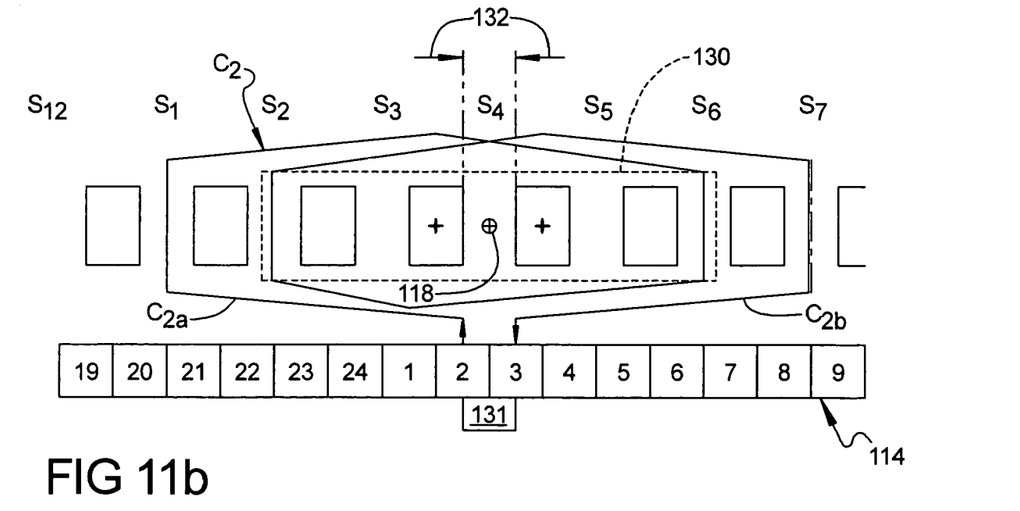
Figure 12A:
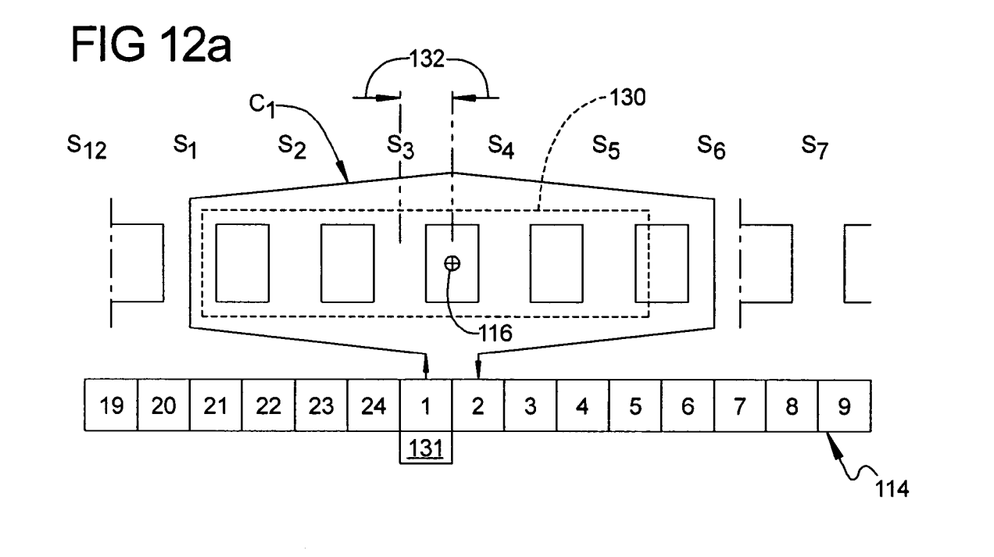
Figure 12B:
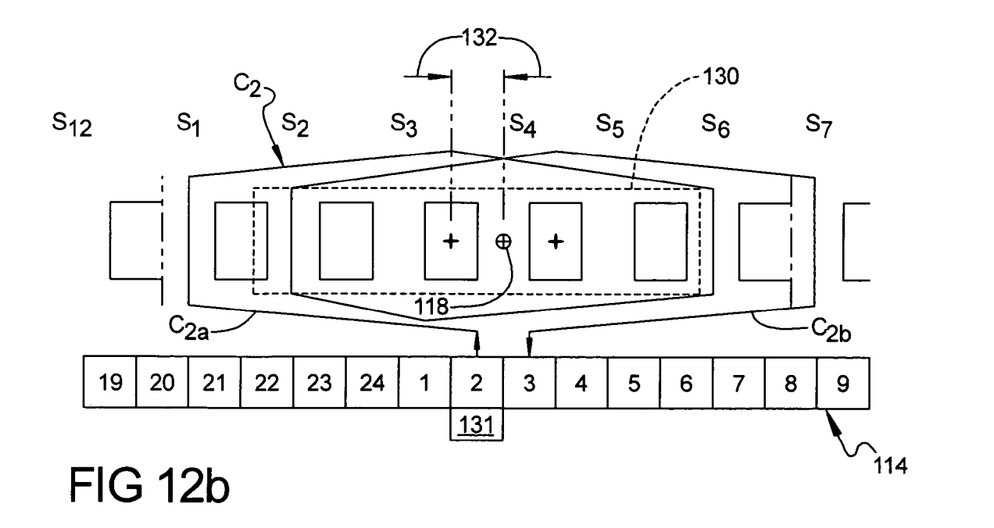
Figure 13A:
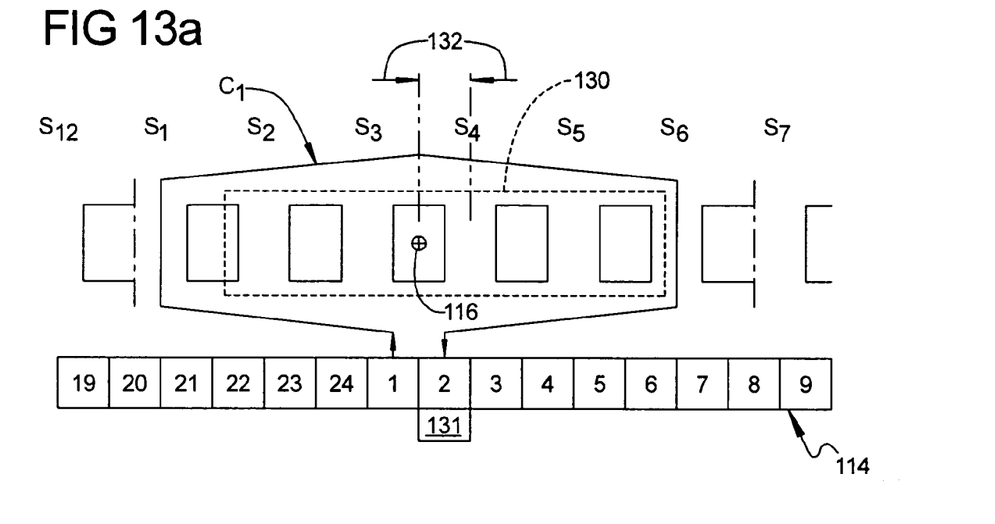
Figure 13B:
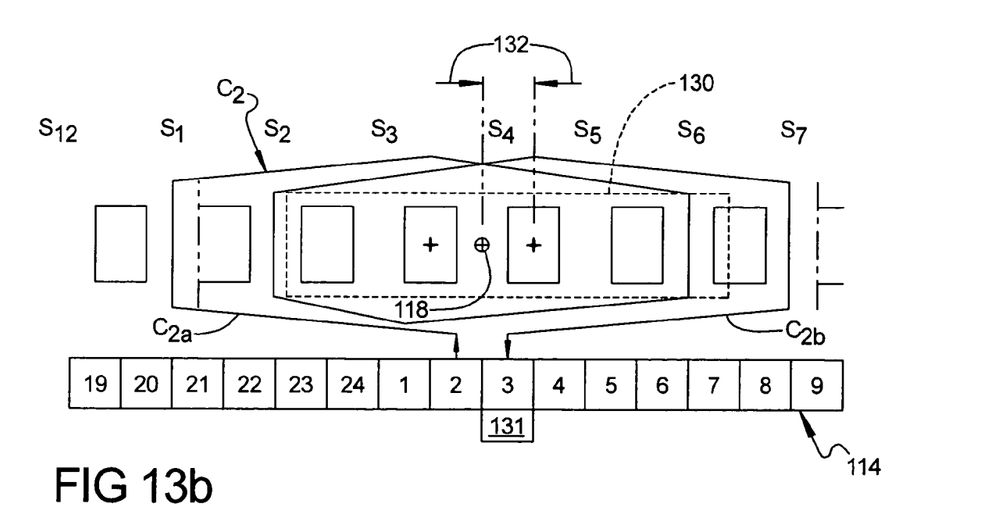

Referring to FIGS. 11, 12 and 13, the angular position of the magnetic axis 116 of each of the first and second coils $C_1$ and $C_2$ can be seen relative to the field pole 130 of the motor 100 and one of the brushes 131. In FIGS. 11a and 11b, the magnetic axis 116, 118 of each of coils $C_1$ and $C_2$, respectively, can be seen to be in the same angular position relative to the field pole 130 when coils $C_1$ and $C_2$ are each about 50% through their commutation cycles. In FIGS. 12a and 12b, the magnetic axes 116 and 118 can each be seen to be in the same angular position, relative to the field pole 130, for coils $C_1$ and $C_2$, at the very beginning of the commutation cycle. In FIG. 13, the magnetic axes 116 and 118 can again be seen to be in the same angular position, relative to the field pole 130, and the brush 131, for each of coils $C_1$ and $C_2$, at the very end of the commutation cycle. Note that in FIGS. 4, 7, 11, 12, and 13, the commutator bars to which the coil ends are connected are shown in the approximate center of the coil. This is a correct position for a motor which has brushes angularly positioned at the center of the field poles. If the brushes were positioned elsewhere, the angular relationship between the commutator bars and the armature slots would need to be shifted accordingly. In this event, the magnetic axes of the armature coils would not coincide with the gap between the commutator bars as shown in the figures, but there still would be a constant angle between the magnetic axes and the associated commutator bars.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A power tool comprising:
    a housing;
    an electric motor supported within said housing;
    said electric motor including having an armature with a plurality of circumferentially arranged winding slots;
    a commutator on said armature with twice as many commutator bars as armature slots;
    a stator having a plurality of field coils defining a commutation zone therebetween;
    said armature including:
        a first coil having a magnetic axis and being coupled to a first pair of said commutator bars wound around a first pair of spaced apart ones of said slots such that said first coil at least substantially completes commutation within said commutation zone;
        a second coil split into first and second serially connected subcoils and coupled to a second pair of said commutator bars, with the first subcoil wound in the first pair of slots and the second subcoil wound in a second pair of said slots offset from said first pair of slots, said subcoils having a resultant magnetic axis, said second coil at least substantially completing commutation within said commutation zone; and
        a third coil having a magnetic axis and being coupled to a third pair of said commutator bars, said third coil being wound into said second pair of slots, said third coil operating to at least substantially complete commutation within said commutation zone; and
    said magnetic axis of each said coil being approximately aligned between the pair of said commutator bars to which said coil is coupled.

2. The power tool of claim 1, wherein said first coil and said second coil have the same number of total winding turns.

3. The power tool of claim 1, wherein said first and second subcoils have the same number of winding turns.

4. The power tool of claim 1, wherein each said coil having said first and second subcoils has one of said subcoils advanced, and the other retarded, relative to said pair of commutator bars to which it is coupled.

5. The power tool of claim 1, wherein the first and third coils each have twice the number of winding turns of the first subcoil of the second coil.

6. The power tool of claim 1, wherein the first coil has twice the number of winding turns as each of the first and second subcoils of the second coil.

7. An electric motor comprising:
    a stator having a plurality of field coils defining at least one gap therebetween, the gap defining a commutation zone;
    an armature supported coaxially within the stator for rotational movement within the stator;
    said armature having a plurality of circumferentially arranged winding slots;
    a first coil wound in a first pair of said winding slots and coupled to a first pair of commutator bars;
    a second coil split into serially connected first and second subcoil portions, said first subcoil portion being wound in said first pair of slots and said second subcoil portion being wound in a second pair of said slots that is circumferentially offset by one slot position from said first pair of slots, said second coil being coupled to a second pair of commutator bars;
    a third coil wound in said second pair of slots and coupled to a third pair of commutator bars;
    each of said first, second and third coils having a magnetic axis that is aligned approximately between said pair of commutator bars to which it is coupled; and
    wherein each of said first, second and third coils substantially complete commutation within said commutation zone.

8. The electric motor of claim 7, wherein each of said coils is coupled to a pair of commutator bars; and wherein each of said first subcoil portions is retarded, relative to said commutator bars to which it is coupled, and each of said second subcoil portions is advanced, relative to said commutator bars to which it is coupled.

9. The electric motor of claim 7, wherein said first coil has a different number of turns from said first subcoil portion of said second coil.

10. The electric motor of claim 7, wherein said first coil and said third coil each have the same number of turns.

11. The electric motor of claim 7, wherein said first coil and said third coil each have twice the number of winding turns as said first subcoil portion of said second coil.

12. The electric motor of claim 7, wherein said first subcoil portion and said second subcoil portion each have the same number of winding turns.

13. The electric motor of claim 7, further comprising a fourth coil having first and second subcoil portions;
said first subcoil portion of said fourth coil being wound in the same slots as said third coil; and
said second subcoil portion of said fourth coil being wound in a third pair of slots circumferentially offset by one slot position from said third coil.

14. The electric motor of claim 7, wherein every other coil on said armature includes a winding having no subcoil portions.

15. The electric motor of claim 7, wherein every other coil on said armature includes a winding having a pair of subcoil portions.

* * * * *